United States Patent [19]
Denis

[11] 3,934,110
[45] Jan. 20, 1976

[54] WELDING SYSTEM AND METHOD FOR ARC STARTING AND CONTROL

[76] Inventor: Albert P. Denis, 2050 Brookview Road, Castleton, N.Y. 12033

[22] Filed: Mar. 11, 1974

[21] Appl. No.: 449,829

[52] U.S. Cl. ............................ 219/131 F; 219/135
[51] Int. Cl.² ............................................ B23K 9/12
[58] Field of Search .................. 219/98, 131 F, 135

[56] References Cited
UNITED STATES PATENTS

| | | | |
|---|---|---|---|
| 2,468,570 | 4/1949 | Nyburg | 219/135 |
| 2,752,469 | 6/1956 | Price | 219/131 F |
| 2,759,120 | 8/1956 | Cornell | 219/135 X |
| 2,832,000 | 4/1958 | Steele | 219/131 F |
| 3,141,085 | 7/1964 | Manz | 219/131 F X |

*Primary Examiner*—J. V. Truhe
*Assistant Examiner*—Clifford C. Shaw
*Attorney, Agent, or Firm*—Sughrue, Rothwell, Mion, Zinn & Macpeak

[57] ABSTRACT

A system and method for controlling a welding program during arc initiation wherein the output current of a welding power supply is dropped in manner such that the generator excitation is limited, or the diode of ctified machine is controlled, as the case may be, accordingly as the electrode or weld wire is motivated downwardly via a feed motor toward a work or cooperating electrode under a condition of low voltage and no current drain, to the end of precluding sticking or adhering of the electrode to the work upon initial contact therewith. Upon contact, and with generator current output at such a minimal value that the electrode will not adhere, a relay becomes deenergized closing other relays and thereby switching the motor so as to be driven in the reverse or up direction at a preset speed and simultaneously reestablishing the full generator output and switching to a sensing circuit for controlling the feed motor drive. This reverse motion stops when the arc voltage reaches a preset welding value. A motor reversal in the form of another downward motion follows a sensing of the attainment of the desired welding voltage with the running speed of the motor being controlled so as to match the desired burn off rate of the electrode. By means of a push button or limit switch or similar stop system, the motor is stopped and the welding current is simultaneously reduced to a nominal value so that continued burn off is precluded. The operation of the power supply involves a safety feature in that at no time is the open circuit voltage allowed to exceed a maximum of 40 volts. The open circuit voltage approximates 20–25 volts as compared to conventional use where the open circuit voltage is from 100 to 125 volts, obviously more of a hazard.

2 Claims, 1 Drawing Figure

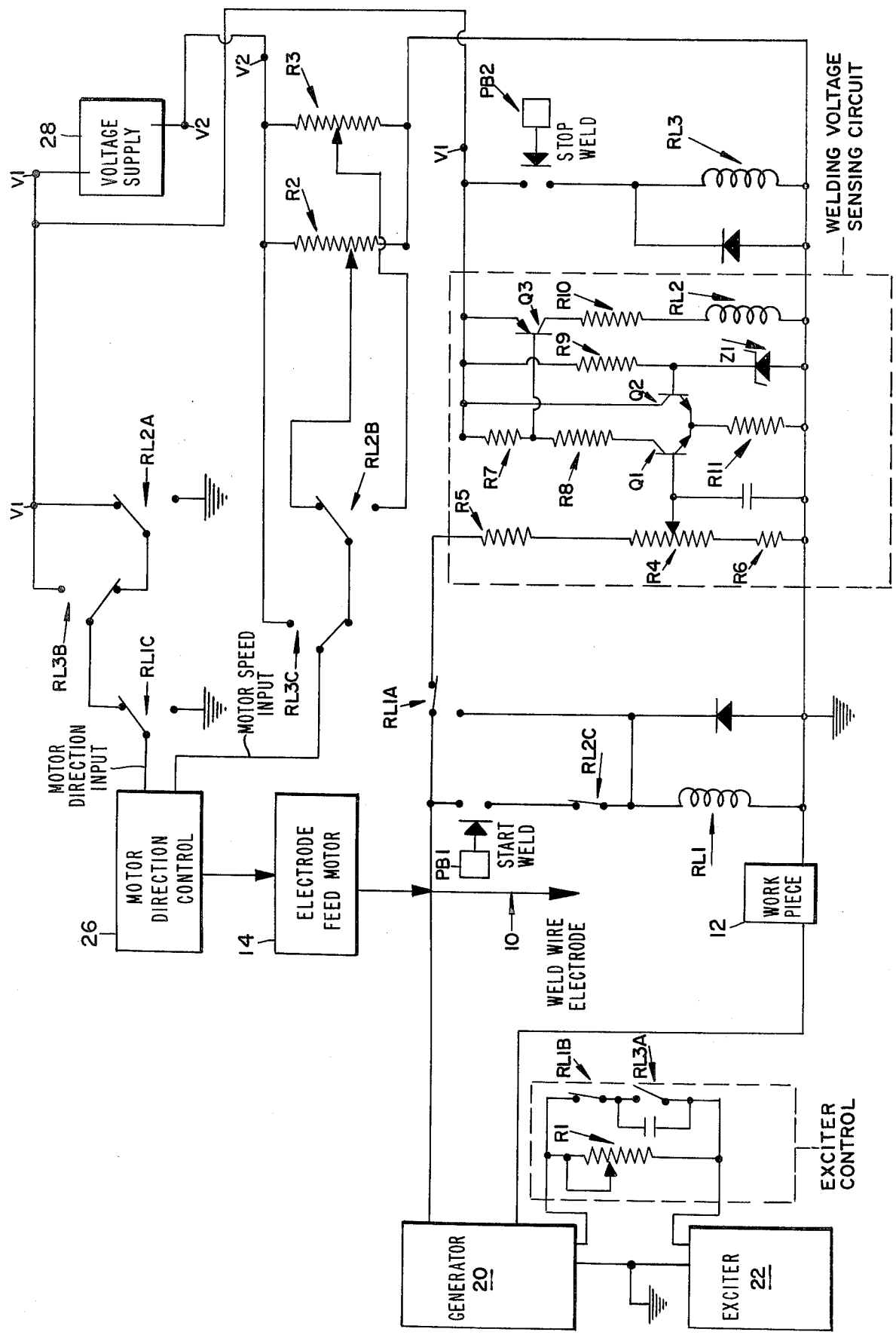

WELDING SYSTEM AND METHOD FOR ARC STARTING AND CONTROL

BACKGROUND OF THE INVENTION

In arc welding operations where a consumable electrode is utilized, it is desirable first to proceed toward the work under controlled conditions and to make contact with the work without the risk of the electrode freezing or attaching thereto. To drive the electrode down to the work under a state of full welding current is to cause the wire to freeze or adhere thereto.

THE PRIOR ART

The known art comprehends the feature of operating a feed motor to send the electrode downwardly to the work by way of a manually-controlled "inch down" button. As in one system, it is left in that position until an arc start button is activated, engaging additional equipment to furnish a DC current in excess of the welding need but yet in a supply adequate to establish the welding arc. In another system, a high frequency starting circuit is used, entailing a need for additional equipment for arc-starting wherein the feed motor makes its downward motion, and immediately prior to contact, the high frequency AC current jumps a gap and induces the arc. Once started, the unit shuts down automatically, leaving only the original current for achieving the welding function.

FIELD OF THE INVENTION

This invention is directed to a new and novel system and means for starting an arc between the electrode or weld wire and work.

SUMMARY OF THE INVENTION

The concept envisions electrically controlling the exciter current of the welding generator or the diode of a rectified machine in conjunction with a feed motor which feeds the electrode. The speed and direction of movement of the feed motor toward and away from the work is controlled through the application of a voltage, variable between a zero and a desired voltage responsive to a characteristic of the welding arc.

THE DRAWINGS

The FIGURE is a schematic circuit diagram of a welding system constructed in accordance with the principles of the invention.

DESCRIPTION OF THE INVENTION

According to the diagram, wherein certain elements are shown in block form, an electrode or weld wire 10 may be fed toward and away from a cooperating electrode in the form of a work piece 12 by means of an electrode feed motor 14.

At the commencement of operational use, electrode 10 driven by feed motor 14 is in a retracted position of farthest withdrawal away from the work piece 12.

A starting button PB1 is actuated to energize relay RL1 to switch relay contact RL1A and thereby latch relay RL1. Relay RL1, also causes the opening of relay contact RL1B, thereby limiting the output voltage and current of a generator 20 and sending the current from an exciter 22 through a resistor R1 to the generator.

Relay contact RL1C connects the motor direction input of motor direction control 26 to ground and thereby causes feed motor 14 to drive the electrode in a direction downwardly toward the work piece 12. Motor direction control 26 is a commerically available device such as, for example, the VE series of DC motor controls manufactured by Boston Gear Division, Rockwell International, of Quincy, Massachusetts.

With the feed motor in feed motor-down position so as to feed the electrode toward the work piece, the output of the generator 20 is nominally controlled by the exciter 22, it being reduced to such a minimal value by the voltage drop across resistor R1 that the electrode will not adhere to the work.

Relay RL1, heretofore latched, is de-energized as the electrode contacts the work piece so as to short circuit the relay coil, thereby effecting a closure of relay contact RL1B and allowing the generator 20 to reestablish its full output.

Simultaneously, relay contact RL1C switches to the feed motor-up position and relay contact RL1A switches the generator output to the welding voltage sensing circuit.

The salient feature is that the generator is allowed to reestablish itself to full output, while simultaneously therewith, the direction of the feed motor is reversed during the all-important arc-establishing program. Feed motor reversal ensues with relative ease, due to the absence of any influencing attraction between electrode and work.

As the feed motor drives the electrode upwardly away from the work, the speed thereof is as determined by potentiometer R2 which is connected through relay contacts RL2B and RL3C to the motor speed input of motor direction control 26.

The voltage ratio at the base of transistor Q1 is set by resistors R5, R4 and R6, R4 being adjustable so as to cause transistor Q1 to turn on at the desired welding voltage.

At the desired welding voltage, the voltage at the base of transistor Q1 matches the reference voltage of Zener Z1 by virtue of transistor Q2 turning transistor Q1 on, thereby causing transistor Q3 to turn on and to energize relay RL2.

With relay contact RL2 energized, relay RL2A sets the motor direction again to the down mode.

With generator voltage restored back to normalcy, the welding voltage sensing circuit senses the proper arc voltage an energizes relay RL2 so as to effect this reversal of feed motor direction in another forward controlled motion for suitable welding.

Relay contact RL2B transfers the drive speed control to potentiometer R3, the potentiometer being set to give a speed corresponding to the burn off rate of the electrode 10.

Relay contact RL2C also opens to lock out the start button during the welding cycle.

When the weld is completed, stop arc button PB2 is activated so as to energize relay RL3, causing relay contact RL3A to open, and placing resistor R1 back in series with the exciter line, thereby limiting the generator output. This extinguishes the arc.

Relay contact RL3B sets the motor direction to up.

Relay contact RL3C sets the return speed to its maximum.

Stop arc button PB2 is held until the motor has returned to start position and is then released, wherefore the cycle may be once again pursued.

The voltage at V1 is suitable for the operation of the welding voltage sensing circuit and motor direction control 26 and the voltage at V2 is suitable for the operation of feed motor 14. Voltages V1 and V2 may be obtained from an external source, such as 28, or may be obtained directly from generator 20 or other power source. Voltage V1 is preferentially in excess of the desired welding voltage, say 25 volts. Voltage V2 is preferentially equal to the voltage of the feed motor 14.

The invention may be described in another way. In preparation for use, the exciter supply lead to the main generator fields is opened up and a control, containing a relay contact RL1B and a resistor R1 in parallel, is inserted in one lead from exciter 22 to generator 20. The relay contact RL1B is used to short out the resistor R1 and to restore the full output of the generator, or prior to shorting, the resistor R1 is included in the circuit to limit the generator output. The resistor is in the circuit up to the time the electrode 10 contacts the work piece 12. When the start switch PB1 is activated, the feed motor 14 drives the electrode 10 to the work piece 12 and upon contact therewith, the shorting effect of the electrode causes the relay RL1 to deenergize, thereby shorting out the resistor. The same relay R1 also reverses the motor 14 and establishes the arc length, voltage and current for a proper welding program.

As in the case of my prior Pat. U.S. NO. 3,501,612 for stud welding device with orbital weld head, this continues until the proper cycle has been completed. At a point of 365 degrees in the operation of my stud welding device, the motor is stopped, and the high welding current is reduced to nominal by opening the relay contact RL3A across the resistor R1. This stops the welding and reverses the motor 14, returning it to starting or idle position.

The operation of the power supply involves a safety feature in that at no time is the open circuit voltage allowed to exceed a maximum of 40 volts. The open circuit voltage here is again about 20–25 volts es compared to conventional use where the open circuit voltage is from 100 to 125 volts, obviously more of a hazard.

The operating cycle may be otherwise defined as follows:

1. — In rest position, the generator 20 output voltage is controlled to a nominal value of less than 40 volts.
2. — A down motion ensues to touch the electrode 10 to the work piece 12.
3. — Delay while the weld current rises to welding value or a preset controlled value and simultaneously on up motion at a preset speed to establish the arc; the up motion stops when the arc voltage reaches a desired welding value.
4. — A down motion when the arc voltage reaches the welding value; the speed is varied by the controller to hold a preset arc voltage during welding.
5. — The arc is stopped and a return motion initiated by a signal at the end of the travel; this signal could be from a current limit in the motor drive or from a limit switch.
6. — In the rest position, the stop is initiated by the current limit or limit switch.

In the event a fully manual operation is contemplated, that is an operation which is under the welder's own full manual control and without a motor means for motivating the electrode toward and away from the work, a system is envisioned within the spirit and scope hereof wherein the welder is allowed to maintain his control merely by holding his operating finger or thumb upon a knob of a hand-held operator adjacent the generator and exciter. In theory, the purpose of the arrangement is to allow the operator to manually bring his electrode into contact with the work in a state of low voltage. Therefollowing, by means of the actuating switch, he resets the generator to its full output wherein the open circuit voltage is that of the arc and well below 40 volts.

I claim:

1. In a welding system including a welding power supply and an electrode feed motor, said power supply being adapted to be connected across a workpiece and a consumable electrode which is driven toward or away from said workpiece by said feed motor, the system for arc starting and control comprising:
    means for initiating a welding operation,
    first switch control means energized by said initiating means,
    switchable voltage limiting means in said power supply and controlled by said first switch control means to limit the output of said power supply,
    first switchable motor direction means controlled by said first switch control means for causing said feed motor to drive said consumable electrode toward said workpiece,
    a circuit including said first switch control means which circuit is completed by the contact of said consumable electrode with said workpiece to de-energize said first switch control means thereby switching said switchable voltage limiting means to permit full output from said power supply and switching said first switchable motor direction means to cause said feed motor to drive said consumable electrode away from said workpiece,
    a switchable voltage threshold device connected across said power supply by the de-energization of said first switch control means, said threshold device providing an output when the voltage across said power supply reaches a preset value,
    second switch control means energized by the output of said threshold device,
    second switchable motor direction means controlled by said second switch control means for causing said feed motor to drive said consumable electrode toward said workpiece, and
    switchable motor speed means controlled by said second switch control means for causing said feed motor to feed said consumable electrode at a preset rate corresponding to the burn off rate.

2. A system for arc starting and control as recited in claim 1 further comprising:
    means for stopping the welding operation,
    third switch control means energized by said stopping means, said switchable voltage limiting means in said power supply being further controlled by said third switch control means to limit the output of said power supply, and
    third switchable motor direction means controlled by said third switch control means for causing said feed motor to drive said consumable electrode away from said workpiece.

* * * * *